United States Patent [19]
Lühmann et al.

[11] Patent Number: 5,427,161
[45] Date of Patent: Jun. 27, 1995

[54] VOLUMETRIC BEVERAGE RECEPTACLE FILLING APPARATUS AND METHOD

[75] Inventors: Peter Lühmann; Harald Schallnus, both of Hamburg, Germany

[73] Assignee: APV Ortmann+Herbst GmbH, Hamburg, Germany

[21] Appl. No.: 202,906

[22] Filed: Feb. 28, 1994

[30] Foreign Application Priority Data

Feb. 27, 1993 [DE] Germany ............... 43 06 120.6
Nov. 9, 1993 [DE] Germany ............... 43 38 190.1

[51] Int. Cl.$^6$ .................................... B65B 3/04
[52] U.S. Cl. .................................... 141/144; 141/1; 141/94; 141/198; 73/290 R; 222/64
[58] Field of Search ............... 141/1, 83, 94, 95, 98, 141/144, 145, 146, 152, 153, 157, 192, 196, 198; 73/290 R, 217, 129, 323; 340/619; 222/64

[56] References Cited

U.S. PATENT DOCUMENTS

| | | | |
|---|---|---|---|
| 4,402,350 | 9/1983 | Ehret et al. | 141/279 |
| 4,676,286 | 6/1987 | Aivola | 141/145 |
| 4,733,095 | 3/1988 | Kurahashi et al. | 340/619 |
| 4,917,155 | 4/1990 | Koblasz et al. | 141/198 |

*Primary Examiner*—Henry J. Recla
*Assistant Examiner*—Steven O. Douglas
*Attorney, Agent, or Firm*—Walter C. Farley

[57] ABSTRACT

Rotating beverage receptacle-filling equipment for filling receptacles has receptacle sites spaced along its periphery and metering containers which can be filled from a beverage tank. Beverage is discharged from the metering containers into the beverage receptacles. A control system recognizes upper and lower liquid levels in the metering containers to control the discharge volume. The metering containers are transparent and at least one stationary video camera observes the metering containers of several adjacent receptacle sites. An image analyzer continuously monitors the metering containers in the field of view of the camera while detecting the levels in different angular positions at the receptacle sites and generates control signals for valves at the receptacle sites. A camera observes the refill limit level to control a refill valve and a camera observes the discharge limit level to control a discharge valve.

13 Claims, 5 Drawing Sheets

VOLUMETRIC BEVERAGE RECEPTACLE FILLING APPARATUS AND METHOD

CROSS-REFERENCE TO RELATED APPLICATION

Reference is made to copending, commonly-owned application Ser. No. 08/202,907, filed Feb. 28, 1994, entitled Method and Apparatus for Filling Transparent Beverage Receptacles, filed concurrently herewith, which is hereby incorporated by reference for all purposes.

FIELD OF THE INVENTION

This invention relates to beverage receptacle-filling apparatus for filling each of a plurality of receptacles with accurately measured volumes of liquid beverage.

BACKGROUND OF THE INVENTION

Presently, using conventional beverage receptacle-filling equipment, the beverage is metered by measuring its level in the receptacle.

Volumetric beverage receptacle-filling equipment on the other hand determines the volume of filled beverage in a metering container which in turn fills the receptacles. Thereby the advantage of substantially higher filling accuracy is achieved, because individual variations among the beverage receptacles then will not affect the accuracy of metering. Using metering containers made in a highly accurate manner and in a very tightly controlled way, substantially higher accuracies of filling are thus possible.

As regards beverage receptacles, the volume is metered in the metering container by filling it to the specified level and/or being discharged from it. Control means are provided to recognize the corresponding level and to then control the filling or discharge procedures.

The state of the art comprises level-recognizing devices which effect level recognition by floats or by dip means. This feature entails the substantial drawback of high apparatus cost for each metering container.

SUMMARY OF THE INVENTION

An object of the present invention is to create beverage receptacle-filling equipment wherein the volume in the metering containers is controlled in a simpler manner.

In accordance with the present invention, the metering containers are made of a transparent material, for instance glass, and at the critical phases of their operational cycle, that is when filling must stop, they pass through the field of view of a video camera which is stationarily mounted next to the beverage receptacle-filling equipment and which views several metering containers, recognizing the filling level by means of an image analyzer. The image analyzer observes a metering container passing through the field of view and determines the level, for instance in an on-going manner, at several angular positions in order to ascertain the time at which the nominal level is reached. Moreover, the image analyzer recognizes the associated receptacle site and emits a closing signal to a valve controlling the filling flow. Depending on operation, alternatively or additionally, a level at which to stop may be ascertained in the same manner when discharging. Therefore several procedures are possible whereby the metering container is operated between a controlled upper level and a controlled lower level, or only an upper level is controlled and the metering container is completely emptied, or the metering container is wholly filled and then emptied down to a controlled lower level.

As a result, the beverage receptacle-filling equipment is substantially simplified. The level monitors of the state of the art which are required at each metering container are thus eliminated. Data processing means which are provided anyway for the beverage receptacle-filling equipment may be used as image analyzers. Also, readjustment to other filling volumes, for instance when changing over to different receptacle sizes, can be very simply carried out by switching programs, without requiring mechanical resetting. The kind of beverage receptacles to be filled is immaterial: they may be glass bottles, plastic bottles, or metal cans. Lastly individual control of individual receptacle sites also is possible in order to take care of individual variations between these sites.

Because the discharge containers are individually monitored to reach specified levels and because filling is controlled by valves at the corresponding receptacle sites, individual recognition and control of the receptacle sites is provided, comparatively inaccurate receiving containers with substantial individual deviations may be used without significantly increasing the complexity of the electronics. Following calibration and ascertaining the required nominal level, these receiving containers can be monitored by the image analyzer so they may be set to their proper individual nominal levels. In this manner differences between the receiving containers is admissible, as a result of which machinery expense is reduced and illustratively particular exchanges of defective receiving containers can be carried out.

It is feasible to fill or discharge more rapidly relative to a given level, and then to very accurately and slowly adjust the limit level by throttling.

If the filling of a metering container is monitored up to a limit level and if it is found that this limit level falls outside the camera field of view, then the initial angle with which filling begins can be accordingly reset. Thereby the camera set-up site need not be changed. In this manner, when changing the angular speed of the beverage receptacle-filling equipment (at constant filling time), the required change of the circumferential angle required for filling can be taken into account. In a similar manner, when discharging, the beginning of the discharge procedure can be shifted for the same purposes.

The particular start setting is carried out individually for the particular receptacle sites. As a result, individual fluctuations in the filling or discharge rates may be compensated, and receptacles sites which are somehow clogged can be so adjusted that they arrive at the particular limit levels in the camera field of view and thereby can be controlled in timely manner.

The receptacles sites are controlled in such a way that the limit level is reached each time at the end of the operational sector, namely the refilling or fill-up sector. As a result the available time intervals can be exploited with maximum effect for a beverage flow as slow and steady as possible.

The ascertained receptacle sites can be directly viewed from the image, for instance by means of the image analyzer detecting numerals affixed to the receptacle sites. If however the angular position of the beverage receptacle-filling equipment is being continuously ascertained, for instance in simple conventional manner, then the load on the image analyzer shall be reduced.

Illustratively, the rate of filling or discharge may be ascertained as the filling parameter, or else this parameter may be the ascertained circumferential angle when reaching a specific level. Receptacle sites found to be defective may be shut down with respect to further operation or may be recorded in a list for the next machine maintenance. Moreover, once reaching the limit level, one may also monitor how much the level changes after the associated valve has been closed. This examination allows checking proper valve operation.

If for instance the discharge in the discharge container is stopped below a specified lower level, then the discharge container may be fitted with a reduced cross-section near that level. This feature results in substantially increased reading accuracy. In similar manner, the cross-section may be reduced for the same purpose also in the area of an upper limit level terminating the filling procedure.

BRIEF DESCRIPTION OF THE DRAWINGS

The invention is illustratively and schematically shown in the drawings wherein.

DESCRIPTION OF THE PREFERRED EMBODIMENTS

Figure 1:
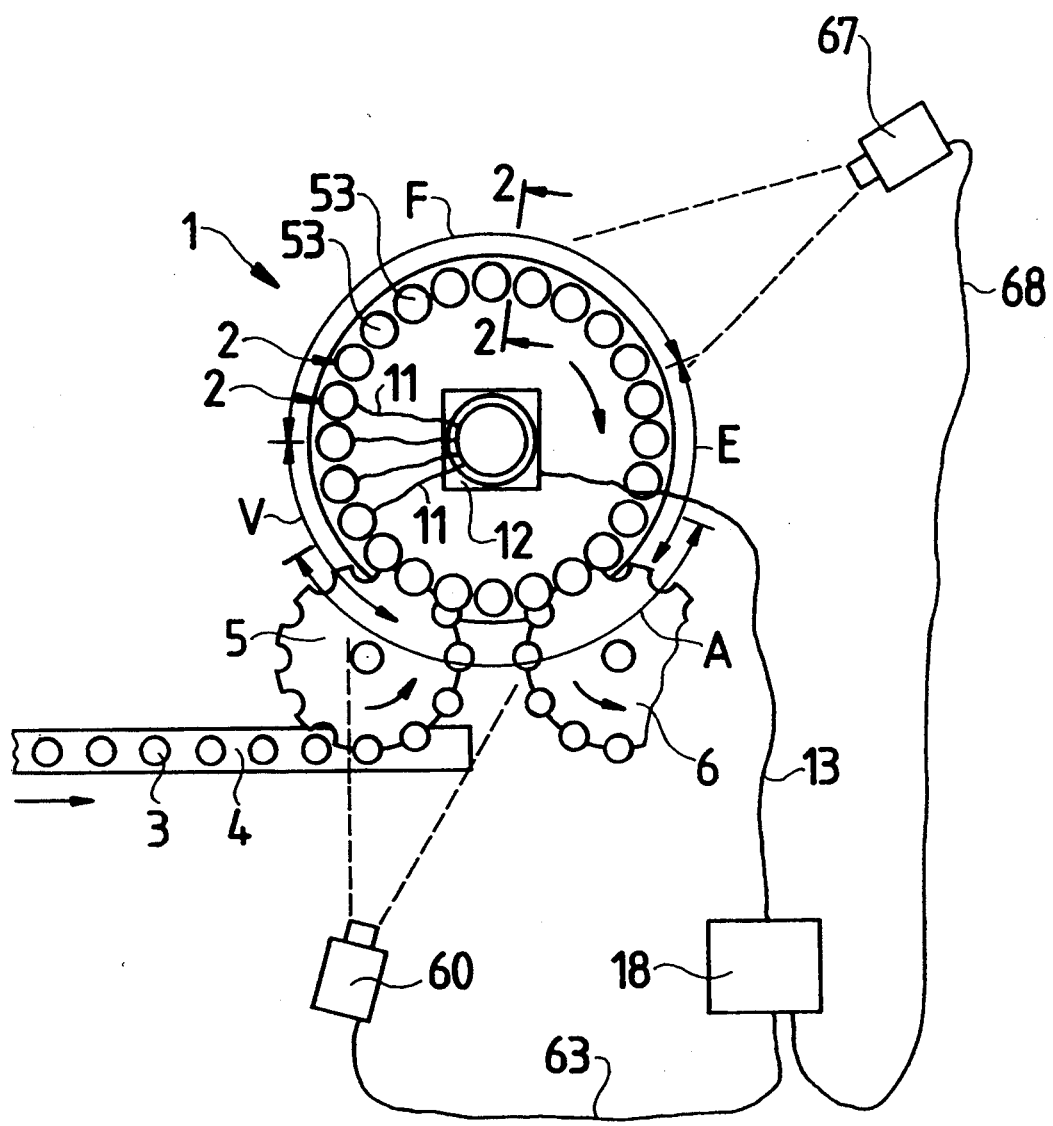
FIG. 1 is a simplified schematic top view of beverage receptacle-filling equipment with two video cameras.

FIG. 1 is a top view of beverage receptacle-filling equipment having a rotatable receptacle-carrying magazine indicated generally at 1 of conventional design. The beverage container filling proceeds as the containers are rotated clockwise. Uniformly spaced receptacle sites 2 at the periphery of the magazine receive receptacles 3 transferred from a conveyor belt 4 by a feed starwheel 5.

The receptacles 3 are moved in the sites 2 around the beverage receptacle-filling magazine 1 and are removed by a discharge starwheel 6 and transferred to further operational equipment such as conveyor belts, sealing devices or the like.

The receptacles 3 may be conventional beverage receptacles, such as glass or plastic bottles, metal cans or the like.

Figure 2:
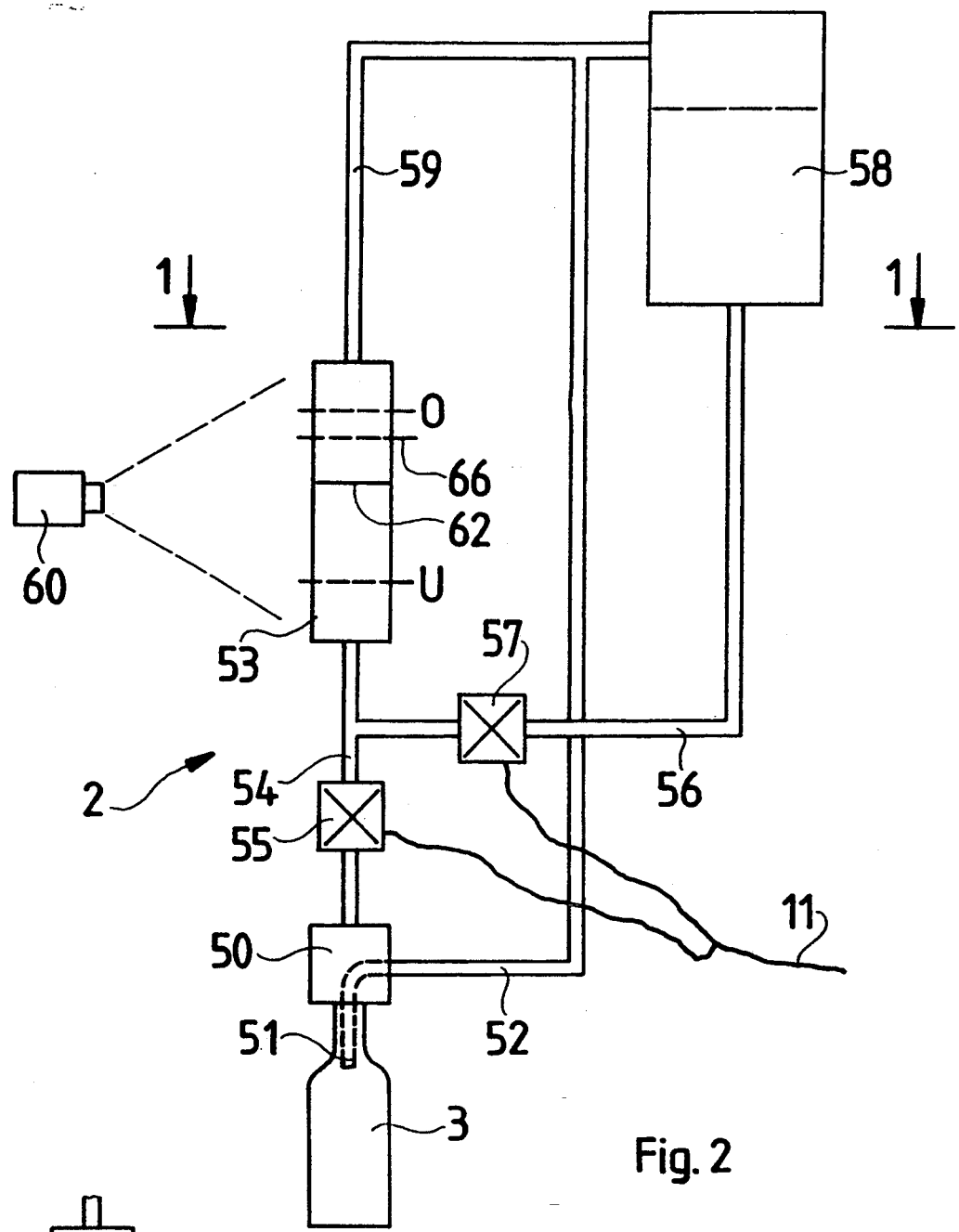
FIG. 2 is a partial side elevation of a receptacle site shown in section along line 2—2 of FIG. 1.

Details of the beverage receptacle-filling equipment 1 that are irrelevant to the present discussion are omitted. FIG. 2 shows the essential devices of a receptacle site.

The receptacle 3 in this instance is a bottle located under a sealing device 50 and being sealed. In the case shown, the receptacle site for filling with carbonated beverages is pressurized. Accordingly, good edge sealing is required between the sealing device 50 and the receptacle 3. To make filling easier, a return-gas conduit 51 shown in dashed lines projects out of the sealing device 50 into the receptacle 3 and is connected to a return-gas line 52.

Devices to vertically displace the sealing device 50 toward the receptacle 3 or the receptacle 3 toward the sealing device 50 may be conventional and for the sake of simplicity are omitted from the Figure.

The beverage, beer for instance, is filled into the receptacle by being emptied from a metering container 53. The discharge from the metering container 53 takes place through a discharge line 54 operated by a remote-controlled discharge valve 55 which may be electrically operated. In the embodiment shown, the volume to be filled into receptacle 3 is adjusted in such a way that the discharge takes place between an upper limit level O and a lower limit level U.

Metering container 53 is connected through a fill-up line 56 with a remotely controlled refill valve 57 to a beverage tank 58 so it can be refilled.

In order to fill a receptacle 3, with discharge valve 55 closed, refill valve 57 is first opened to fill the metering container 53 to the upper limit level O. Thereupon refill valve 57 is closed and discharge valve 55 is opened until the lower limit level U has been reached. Discharge valve 55 then is closed. The volume admitted into receptacle 3 corresponds to the level difference O−U in metering container 53. The volume to be discharged can be matched to different volumes of receptacles 3 by changing the settings of O and U.

It is possible furthermore to totally fill metering container 53 and only to control the lower limit level U. It is also possible to wholly empty metering container 53 and to control only upper limit level O. In such cases, however, the advantages of under-filling metering container 53 in a foam-free manner will be forfeited.

In the embodiment shown, wherein receptacle 3 is filled while being pressurized, the upper end of the metering container 53 is connected through a gas conduit 59 to the gas space in the beverage tank 58 which is also connected to the gas-return line 52. When filling with non-carbonated beverages, gas lines 52 and 59 may be omitted along with the sealing between sealing device 50 and receptacle 3. In that case the return-gas conduit 51 can be replaced for instance by a short filling tube.

In order to very accurately fill receptacles 3, as prescribed by law, the upper limit level O and the lower limit level U in metering container 53 must be adjusted very accurately and accordingly valves 55 and 57 must be sharply closed at the right time.

Figure 3:
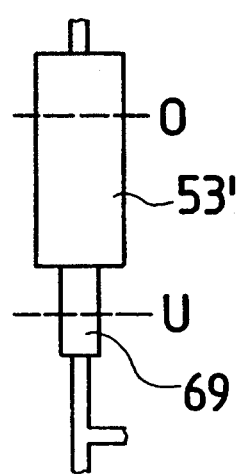
FIG. 3 is a elevation of one embodiment of a single metering container when seen in the elevation of FIG. 2.

This task can be made easier first by reducing the cross-section of the metering container in the vicinity of a monitored limit level relative to its cross-section elsewhere. A further embodiment of a metering container 53' with this feature is shown in FIG. 3. In that embodiment, a lower part 69 of the container is smaller in diameter that the upper part, the lower part including lower limit level U. The reading accuracy at the lower limit level U is much enhanced by this change. Similar steps also may be taken in the vicinity of the upper limit level O.

To allow precise monitoring of limit levels O and U, the metering container 53 or 53' consists of a transparent material, for instance glass, at least in those specific sectors in which visual inspection is desired. A video camera 60 stationarily mounted outside the beverage receptacle-filling equipment views metering containers 53 at several receptacle sites 2 in its field of view 61 (FIG. 4) as these sites move in the direction of the arrow through the stationary field of view.

Figure 4:
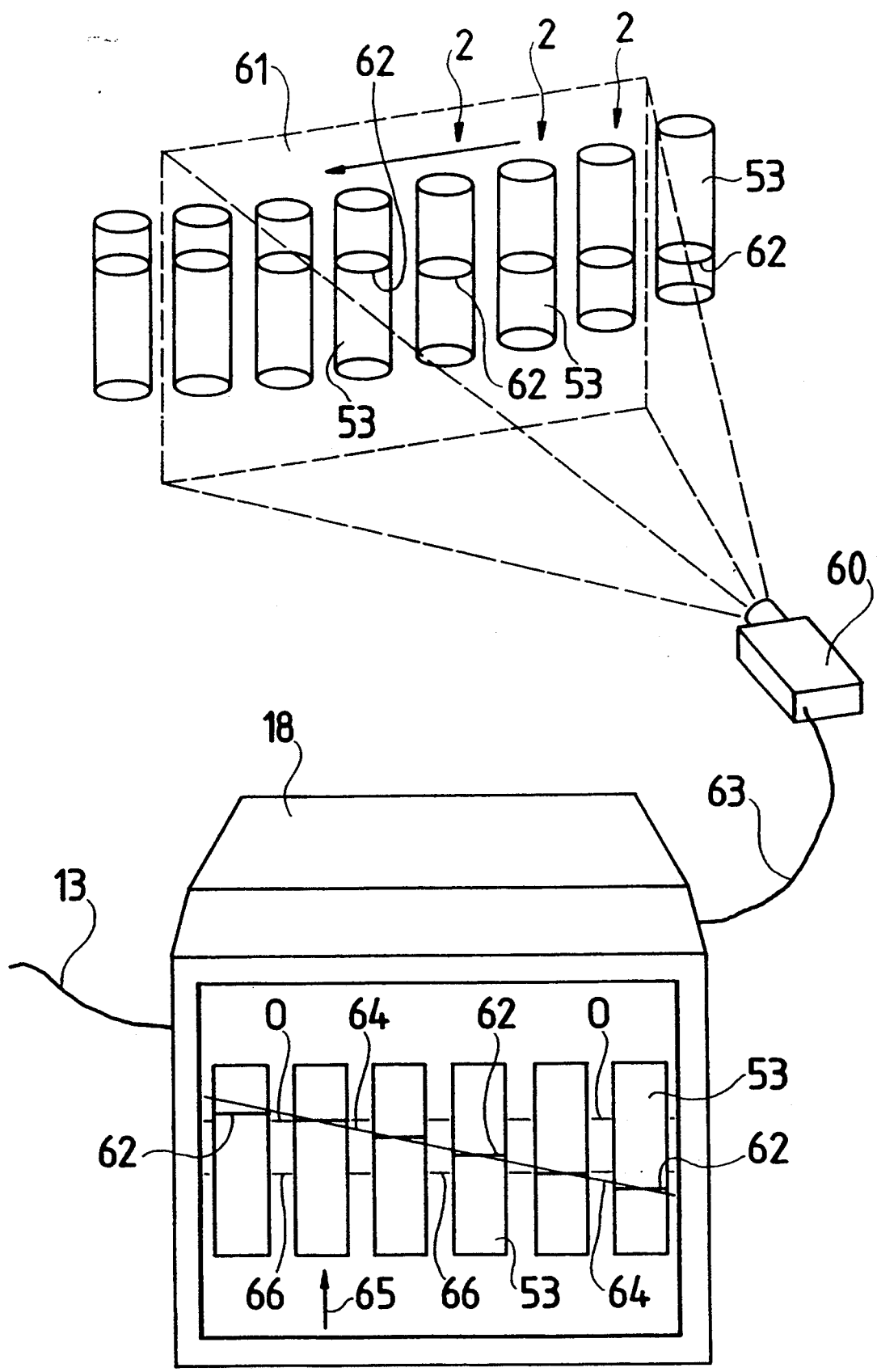
FIG. 4 is a perspective view of a video camera directed toward a series of containers and a monitor with the camera field of view displayed on the monitor.

FIG. 4 at the top also shows the beverage levels 62 in metering containers 53. It will be apparent that when filling is in progress, the beverage level 62 rises as metering containers 53 move through field of view 61.

The top view of FIG. 1 shows the beverage receptacle-filling equipment 1 with four operational zones A, V, F and E. In sector A, the metering containers 53 are refilled from supply tank 58. After the receptacles 3 have entered the beverage receptacle-filling equipment 1, they are first loaded with pressurizing gas in a pressurizing sector V, for instance by opening a valve (omitted from FIG. 2) in the gas-return line 52 acting as the pressurizing line. The filling sector F, wherein the receptacles are being filled, begins after pressurizing sector V. The next sector is the pressure relief sector E, where the pressure at the head space of the filled receptacles 3 is relieved by valves at sealing devices 50 (not shown) so that these receptacles can be removed in an un-pressurized state from beverage receptacle-filling equipment 1 by starwheel 6.

Metering container 53 is filled up outside filling sector F in refill sector A that, as seen in the direction of revolution of the beverage receptacle-filling equipment, begins in relief sector E and ends in pressurizing sector V.

As shown by FIG. 4, camera 60 is used to monitor the upper limit level O and as shown by FIG. 1 is positioned so that its field of view 61 covers the end portion of the refill sector A. Filling up a metering container 53 terminates in that end portion as shown in FIG. 4 when level 62 reaches the upper limit level O in metering containers 53.

Camera 60 is connected by a cable 63 to an image analyzer 18 which displays the field of view 61 for comparison purposes on its monitor screen in which the images of the receptacle sites with metering containers 53 and the levels 62 in them are shown.

The monitor of image analyzer 18 shows that, as seen in the direction from right to left of the moving metering containers 53, levels 62 rise along a straight line 64. The dashed line O denotes the upper limit level to be monitored and which can be fed for instance from a control desk to the image analyzer. When the upper limit level O is reached in a receptacle, shown in the example at site 65, then the image analyzer 18 emits a signal to close refill valve 57.

For that purpose and as shown in FIG. 1, image analyzer 18 is connected by a cable 13 to a rotary distributor 12 of the beverage receptacle-filling equipment 1 from which cables 11, illustratively buses, run to individual receptacle sites 2 to permit address control of individual valves at individual sites where said cables are connected to control valves 55 and 57.

If, as shown in FIG. 4, a specific receptacle site within the beverage receptacle-filling equipment 1 reaches the upper limit level O at the site 65, then a signal to shut off refill valve 57 is emitted precisely to that receptacle site. The associated receptacle site can be ascertained in any suitable manner, for instance by recognizing individual features, such as numbers painted on the metering containers, with the image analyzer or by counting the receptacle sites using a light or photocell barrier relative to a null mark.

To increase precision when setting the upper limit level O, a somewhat lower level 66 shown in dashed lines in FIG. 4 on the monitor screen may be preset which, when it is reached, causes a throttling signal to be transmitted to discharge valve 55 to cause refilling to proceed more slowly between level 66 and limit level O.

When the beverage receptacle-filling equipment begins operating, image analyzer 18 is able to ascertain whether the level 62 in metering containers 53 seen in the field of view 61 reaches upper limit level O at all. If not, or if the beverage receptacle-filling equipment is running at so high a rate that the upper limit level O is not reached within the time available within fill-up sector A, then the image analyzer 18 can emit a signal to reset the initial time corresponding to the fill-up start angle of fill-up sector A. Resetting takes correspondingly place in the other direction if the upper limit level O is being exceeded within the field of view 61.

There may also be some out-of-tolerance cases, such as individual receptacle sites 2 which are clogged or for which refill valve 57 does not properly open. Such cases are recognized individually and the invention offers the possibility to individually reset the opening of the fill-up valve 57 to a suitable initial angle by appropriate control from image analyzer 18.

Another camera 67 is provided to monitor the lower limit level U when draining the beverage from the metering container 53 into a beverage receptacle 3 and is also connected by a cable 68 to image analyzer 18. Camera 67 views the end area of the fill sector F where filling the beverage receptacles 3 ends, that is, where the lower limit level U in the metering container 53 is reached. As shown by comparison with FIG. 4, the relations are similar. Only the following differences apply:

The levels 62 in the metering containers 53 do not rise, but instead drop and reach the lower limit level U illustratively on the monitor screen of FIG. 4 instead of the level 66. The straight line 64 representing the level rise in this case would go the other way, that is from top right to bottom left. In this case as well a preset level corresponding to the level 66 may be provided to illustratively substitute for the level O and to cause a throttling signal when being reached.

The image ascertained by camera 67 can be analyzed in the above described manner and stop signals transmitted to the draining valve 55 of the associated receptacle site if at this site the level in metering container 53 drops to the lower limit level U.

In this case the initial angle, that is the circumferential angle to which the draining valve 55 is opened, can be reset to allow observing that the lower limit level U is being reached in the field of view of the camera 67. This resetting again can take place jointly for all receptacle sites or individually to take into account individual differences in draining rates.

Figure 5A:
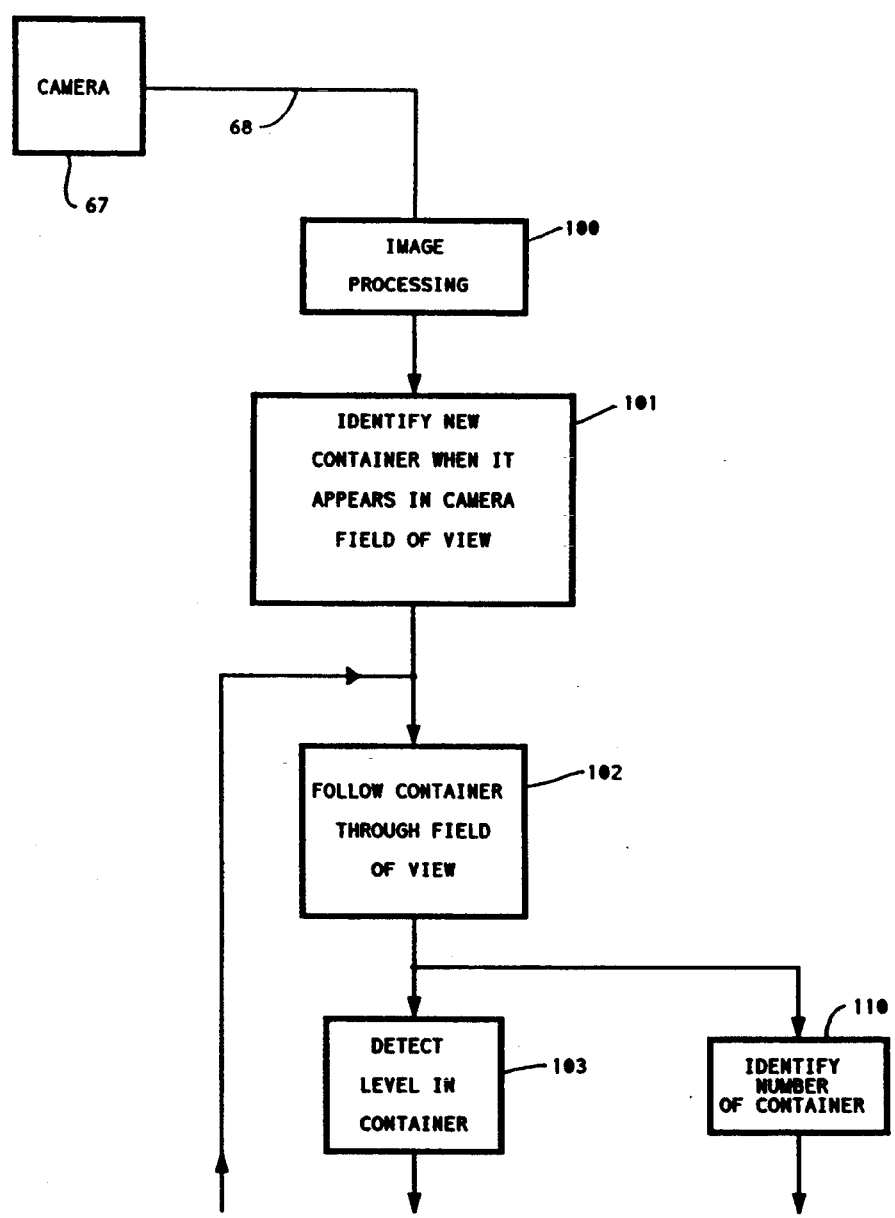
FIGS. 5A and 5B, taken together, are a flow diagram of the method performed by the apparatus.
Figure 5B:
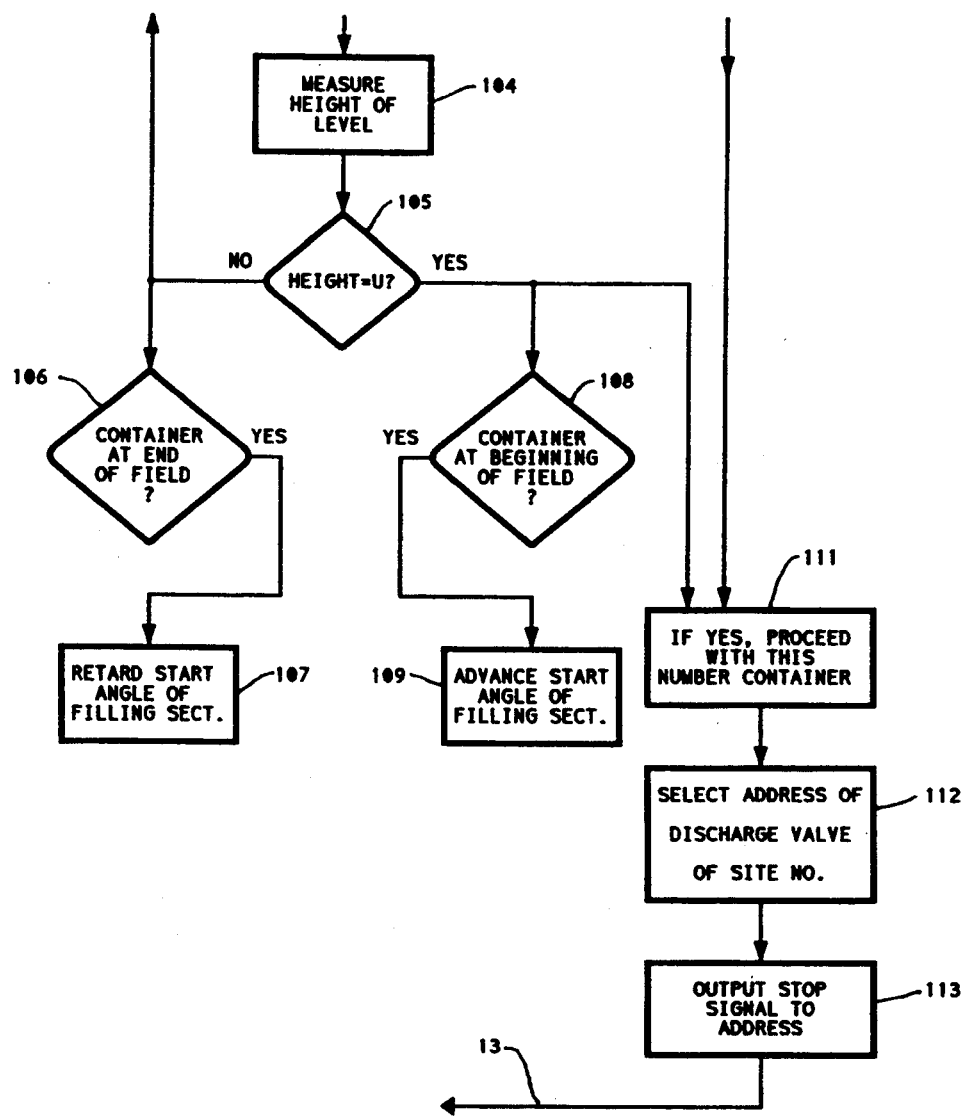

FIGS. 5A and 5B, taken together, constitute a flow chart continuing from FIG. 5A onto FIG. 5B showing the steps in the method performed by the apparatus of the invention. The flow charts describe the processes in a computer which is used as an apparatus control and also comprises image analyzer 18. The process begins with the video signals from camera 67 which observes the end of filling sector F. As mentioned above, the system can be used to meter the liquid level in the refillable metering containers and can use the volume between level O and an empty metering container, between a full container and level U, or between levels O and U. In addition a level 66 between O and U can be employed to reduce the flow rate. Depending on which technique is used, the computer is loaded with the values of one or more of the heights for O, U and 66. For simplicity, the method will be described only using the lower limit U at which filling must be stopped, recognizing that a very similar technique is employed if the other values are used. The computer is also loaded with addresses of all discharge valves 55 which must be closed when U is reached.

In this apparatus, the computer has image processing capabilities not only for detecting and measuring the liquid level within the container but also to identify and read a number placed somewhere on the receptacle site, e.g., painted on the container or the holder.

In FIG. 5A, video signals are generated by camera 67 and are conveyed on conductors 68 to the computer which will do the image processing. In the first step 100, the image from the camera is processed in any way suitable, as known from image processing technology, so that information from the image can be extracted and processed. In step 101, each new container appearing in the field of view of the camera is recognized and identified as such for further processing. The new container is followed through the field of view, 102, and the level of liquid is detected. The height of that liquid level is measured, 104, and the measured height is compared with the stored value of U in step 105. If the measured height does not equal U, the loop is repeated from step 102.

Also, if in step 105 the answer is "no" step 106 determines whether the receptacle has reached the end of the viewing field. If the level had not reached level U but the receptacle has reached the end of the field, this would indicate that insufficient time has been allowed for filling and a signal is produced which retards the starting angle at which filling commences. This starts the filling earlier so that subsequent receptacles will be filled to level U somewhere in the middle of the viewing field, as it should be.

If step 105 produces a "yes" result, indicating that the height has reached level U, and if step 108 indicates that the receptacle is arriving at the beginning of the field already full, step 109 causes the beginning of the filling to start later, i.e., the starting angle is advanced. This shortens the filling time, again allowing the level U to be reached somewhere in the middle of the viewing field.

In parallel with step 103, the number of the container is identified in step 110 and delivered to step 111 which also received the "yes" response from step 105, indicating that the receptacle is properly filled. Step 111 proceeds with that number only if it received a "yes" from step 105. The number is delivered to step 112 where the bus address of the discharge valve associated with that receptacle is selected from a table. The address proceeds to step 113 where a stop signal is generated which consists of a stop command and the address from 112. The stop command on bus 13 thus reaches the address of the proper discharge valve to terminate filling of the container which has been recognized as filled to level U.

What is claimed is:

1. A liquid beverage receptacle-filling apparatus for filling receptacles with predetermined volumetric quantities of beverage comprising the combination of:
    a rotatable receptacle carrier having a plurality of receptacle sites for moving a sequence of receptacles along a generally circular path;
    a plurality of refillable transparent metering containers movable along said path in conjunction with said receptacle sites;
    conduit means for conducting beverage from a metering container to a receptacle disposed adjacent said metering container;
    a beverage tank and conduits for selectively refilling said metering containers;
    valve means in said conduit means and said conduits for controlling refilling of said metering containers and flow of beverage from said metering containers to said receptacles; and
    control means for determining levels of liquid in said metering containers and controlling the volume of beverage to be discharged into each receptacle from one of said metering containers, said control means including
        a stationary video camera positioned to observe metering containers at a plurality of adjacent receptacle sites within a field of view of said camera, and
        image analyzer means for receiving video signals from said camera and continuously monitoring liquid levels in metering containers within said field of view of said camera in a sequence of said adjacent receptacle sites and for transmitting control signals to said valve means at selected receptacle sites for controlling either refilling of said containers or discharge of said selected volumes of beverage from said containers to said receptacles.

2. An apparatus according to claim 1 wherein said video camera observes metering containers as said containers are being refilled.

3. An apparatus according to claim 2 wherein said path is divided into angular sectors including a refill sector (A) in which said metering containers are refilled and a sector (F) in which said receptacles are filled from said metering containers, and wherein, when said image analyzer means determines that a limit level (O, U) has been reached in a metering container, said image analyzer means ascertains the angular position at which that limit level is reached and resets an initial angle of said refill sector (A) or of said receptacle filling sector (F).

4. An apparatus according to claim 3 wherein, when a limit level (O, U) is being reached, said analyzer means determines an angular position associated with an individual receptacle site at which said limit is reached and transmits individual start signals for filling-up or discharging to associated receptacles at the next revolution of said carrier.

5. An apparatus according to claim 3 wherein a start of refill or discharge is controlled so that said limit level (O, U) is reached at the end of an associated operational sector (A, F).

6. An apparatus according to claim 1 wherein said video camera observes metering containers as said containers are being emptied.

7. An apparatus according to claim 1 and including a second video camera positioned to observe metering containers at a plurality of adjacent receptacle sites different from those observed by said first-mentioned video camera, said first camera observing refilling of said containers and said second camera observing discharging thereof, and wherein said image analyzer means detects upper and lower liquid limit levels (O, U) in each of said metering containers to establish said selected volume of beverage.

8. An apparatus according to claim 7 wherein said image analyzer means detects at least one intermediate level between said limit levels (O, U) and emits a throttling signal when said intermediate level is reached to reduce the rate of liquid flow.

9. An apparatus according to claim 1 and comprising means for continuously ascertaining an angular position of said beverage receptacle carrier and for transmitting said position to said image analyzer means.

10. An apparatus according to claim 9 wherein said image analyzer means detects receptacle sites outside predetermined tolerances with respect to selected fill parameters.

11. An apparatus according to claim 1 wherein each of said metering containers has a reduced cross-section in a region of a limit level (U).

12. A computer-implemented method of controlling a liquid beverage receptacle-filling apparatus for filling receptacles with predetermined volumetric quantities of beverage comprising the steps of:

providing a rotatable receptacle carrier having a plurality of receptacle sites for moving a sequence of receptacles along a generally circular path;

providing a plurality of refillable transparent metering containers movable along said path in conjunction with said receptacle sites with conduit means for conducting beverage from a metering container to a receptacle disposed adjacent the metering container, a beverage tank and conduits for selectively refilling the metering containers and valve means in the conduit means and the conduits for controlling refilling of the metering containers and flow of beverage from the metering containers to the receptacles, positioning a stationary video camera to observe metering containers at a plurality of adjacent receptacle sites within a field of view of said camera and to produce electrical signals representative of images of the containers, and delivering the electrical image signals to a computer for receiving video signals from said camera and continuously monitoring liquid levels in metering containers within said field of view of said camera in a sequence of adjacent receptacle sites, and transmitting control signals to the valve means at selected receptacle sites for controlling either refilling of said containers or discharge of the selected volumes of beverage from said containers to the receptacles.

13. A method according to claim 12 and including positioning a second video camera positioned to observe metering containers at a plurality of adjacent receptacle sites within a field of view of said camera and to produce electrical signals representative of images of the metering containers at a plurality of adjacent receptacle sites different from those observed by the first-mentioned video camera, said first camera observing refilling of said containers and said second camera observing discharging thereof.

* * * * *